(12) United States Patent
Cole

(10) Patent No.: US 7,581,756 B2
(45) Date of Patent: Sep. 1, 2009

(54) UNIVERSAL CAB GUARD

(76) Inventor: Leslie Cole, 14 Burrell Road, Turtle Creek, New Brunswick (CA) E1J 1S6

( * ) Notice: Subject to any disclaimer, the term of this patent is extended or adjusted under 35 U.S.C. 154(b) by 510 days.

(21) Appl. No.: 11/493,545

(22) Filed: Jul. 27, 2006

(65) Prior Publication Data

US 2006/0261586 A1    Nov. 23, 2006

Related U.S. Application Data

(62) Division of application No. 10/934,418, filed on Sep. 7, 2004, now Pat. No. 7,121,585.

(60) Provisional application No. 60/501,079, filed on Sep. 9, 2003.

(51) Int. Cl.
    *B60P 7/00* (2006.01)
(52) U.S. Cl. .......................... 280/748; 296/43
(58) Field of Classification Search ............. 296/3, 296/43; 280/748, 756; 224/403, 405; 410/129, 410/144, 145; 362/541
    See application file for complete search history.

(56) References Cited

U.S. PATENT DOCUMENTS

| 3,047,161 A | 7/1962 | Thacker |
| 3,664,704 A | 5/1972 | Ellis |
| 3,765,713 A | 10/1973 | Suitt |
| 4,564,216 A | 1/1986 | Kinyon et al. |
| 4,611,824 A | 9/1986 | McIntosh |
| 4,867,497 A | 9/1989 | Jayne |
| 4,948,311 A | 8/1990 | St. Pierre et al. |
| 5,035,458 A | 7/1991 | Boensch |
| 5,143,415 A | 9/1992 | Boudah |
| D388,385 S * | 12/1997 | Protz, Sr. .................. D12/167 |
| 6,557,917 B1 | 5/2003 | Colcombe |
| 6,983,968 B2 * | 1/2006 | Brauer et al. .................. 296/3 |
| 7,121,585 B2 * | 10/2006 | Cole .......................... 280/748 |
| 2002/0066761 A1 | 6/2002 | Vining |
| 2003/0011180 A1 | 1/2003 | Coffman et al. |

FOREIGN PATENT DOCUMENTS

| CA | 1007269 | 3/1977 |
| CA | 2011525 | 9/1991 |
| CA | 1298863 | 4/1992 |
| CA | 2213762 | 2/1999 |
| CA | 2300368 | 8/2001 |
| CA | 2339686 | 9/2001 |

* cited by examiner

*Primary Examiner*—Stephen Gordon
(74) *Attorney, Agent, or Firm*—Mario Theriault

(57) ABSTRACT

The cab guard for a pickup truck has a horizontal base member made of square hollow structural steel; an upright structure extending upward from the horizontal base member, and two anchor brackets for attachment to sides of a pickup truck box. Each of the anchor brackets has a stem made of square hollow structural steel and an anchor plate extending at right angle from the stem. Each stem is telescopically engaged in one end of the horizontal base member. The cab guard also comprises a pair of J-shaped hooks extending through the anchor plates for attachment to the stake pockets of a pickup truck box, for retaining the anchor plates to the sides of the pickup truck box. The universal cab guard is mountable to the front stake pockets of a pickup truck box and is adjustable to match the width between the stake pockets.

2 Claims, 5 Drawing Sheets

UNIVERSAL CAB GUARD

This application is a division of prior application Ser. No. 10/934,418, filed Sep. 7, 2004, and now U.S. Pat. No. 7,121,585, which claims benefit of Ser. No. 60/501,079, filed on Sep. 9, 2003.

FIELD OF THE INVENTION

This invention pertains to guards for mounting behind truck cabs, and more particularly, it pertains to adjustable cab guards for mounting to various models of pickup trucks.

BACKGROUND OF THE INVENTION

Loose objects carried in a pickup truck box can shift toward the front of the truck box and be projected through the rear window of the truck cab when the pickup truck comes to a sudden stop or decelerates quickly. It is therefore desirable to protect the rear cab window, and the passengers of a pickup truck, from such loose objects carried in the truck box A cab guard is also advantageous for protecting the cab window from damage due to careless handling of long objects in and out of the truck box.

Pickup trucks have different dimensions from one model to another and from one year of manufacture to another in a same model. Therefore, most cab guards used in the past were custom made by the truck owners to fit their own trucks. Few manufacturers have introduced cab guards to be sold as after-market accessories. However, these cab guards are also limited as to the models of pickup trucks on which they can be mounted.

Examples of cab guards of the prior art being sold as after-market accessories are described in the following documents:

U.S. Pat. No. 4,611,824 issued to Thomas K. McIntosh on Sep. 16, 1986;
U.S. Pat. No. 4,867,497 issued to Gilbert Jayne on Sep. 19, 1989.

Although the prior art cab guards deserve undeniable merits, it is believed that a need still exists for an universal cab guard that can be fitted to most North American pickup trucks now in service, without modification to the truck itself.

SUMMARY OF THE INVENTION

In the present invention, there is provided a cab guard that is adjustable widthwise to accommodate various sizes of pickup trucks, and in which a brake light window is adjustable up and down to align with the courtesy brake light behind the truck cab.

In accordance with a first aspect of the present invention, there is provided a cab guard for a pickup truck, comprising; a horizontal base member made of square hollow structural material; an upright structure extending upward from the horizontal base member, and two anchor brackets for attachment to the sides of a pickup truck box. Each of the anchor brackets has a stem made of square hollow structural material and an anchor plate extending at right angle from the stem. Each stem is telescopically engaged in one end of the horizontal base member. The cab guard also comprises a pair of J-shaped hooks extending through the anchor plates and having means for attachment to the stake pockets of a pickup truck box for retaining the anchor plates to the sides of the pickup truck box. The universal cab guard is mountable to the front stake pockets of a pickup truck box and is adjustable to match the width between the stake pockets. It is believed that the universal cab guard according to the present invention is mountable to most North American pickup trucks now in use, without modification to the truck.

In another feature of the present invention, the upright structure has a thickness that is smaller than the thickness of the horizontal base member. The upright structure is affixed to the horizontal base member with the front plane thereof being even with the front side of the horizontal base member. The anchor plate in each anchor bracket extends at right angle with the stem from one side of the stem. Each stem has a thickness which is a same dimension as the thickness of the upright structure. Each stem is telescopically engaged in one end of the horizontal base member, with the anchor plate extending parallel with the upright structure along the rear side of the upright structure.

The cab guard with the above-described mounting of the anchor brackets constitutes a compact arrangement which is easily handled, packaged and shipped to a buyer.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

One embodiment of the present invention is illustrated in the accompanying drawings, in which like numerals denote like parts throughout the several views, and in which.

DESCRIPTION OF THE PREFERRED EMBODIMENT

Figure 1:
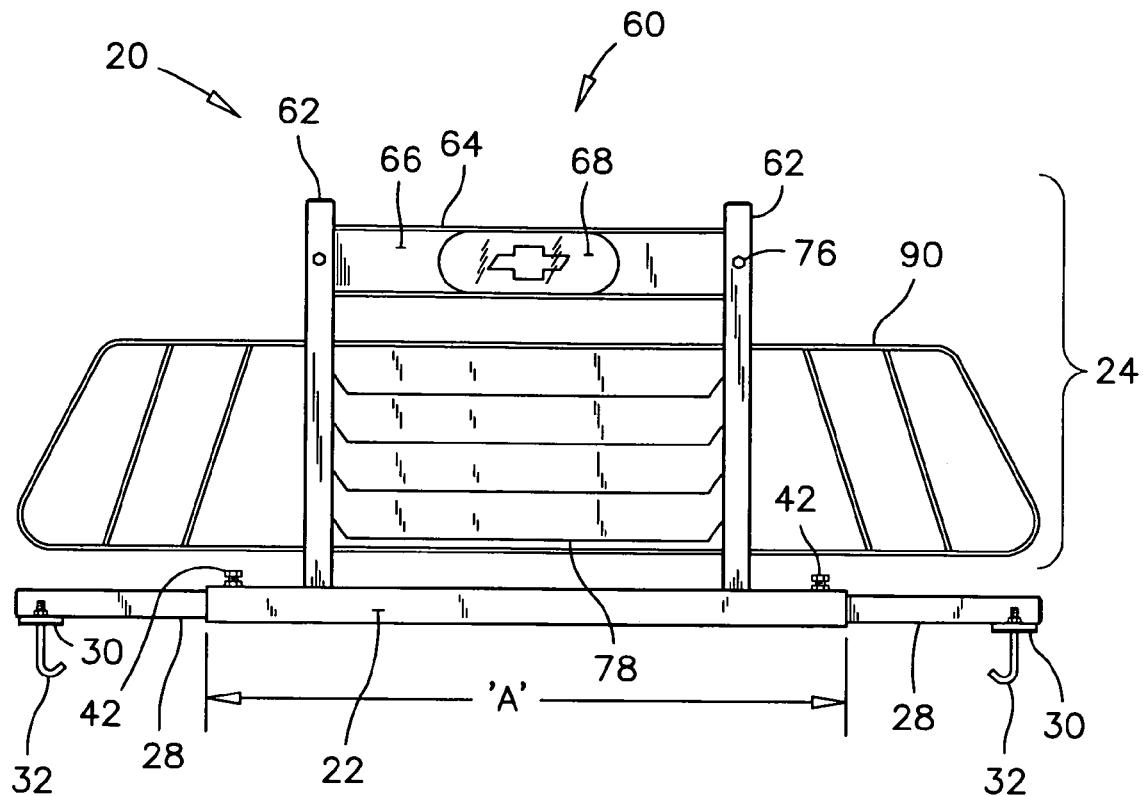
FIG. 1 is a rear view of the universal cab guard according to the preferred embodiment.

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described.

The preferred universal cab guard 20 comprises a horizontal base member 22 made of square hollow structural steel 2"×2"×3/16" wall thickness. In use, this horizontal base member 22 spans along the width of the truck box over the front edge of the truck box, behind the cab.

Figures 2, 3:
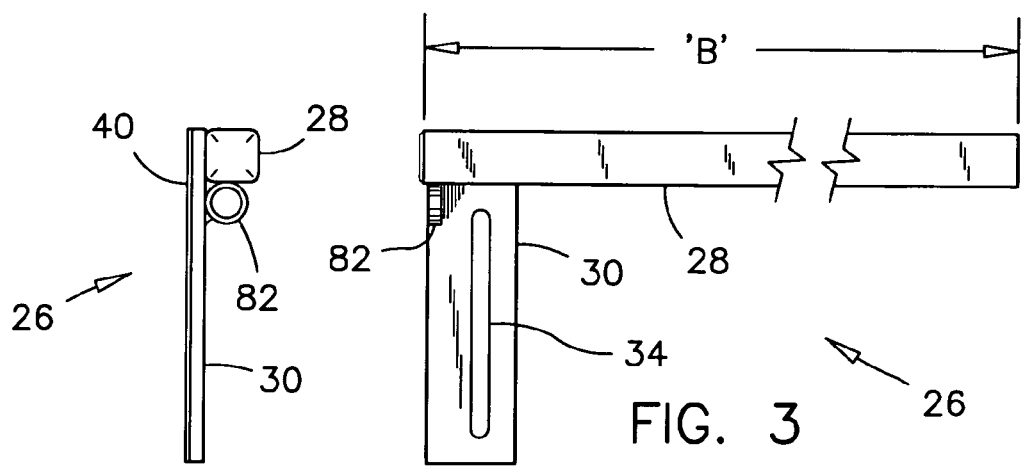
FIG. 2 is an end view of one of the anchor brackets in the universal cab guard.
FIG. 3 is a plan view of the anchor bracket.

An upright structure 24 extends from this base member 22 to cover most of the rear side of the cab, and especially the rear window of the truck cab. A pair of anchor brackets 26 are telescopically mounted into the ends of the base member 22, and are adjustable sideways relative to the base member 22. Each anchor bracket 26 has a square stem 28 and a slotted anchor plate 30 extending at right angle from the stem 28, from the end of the stem. Each anchor plate 30 is welded to the outside surface of the stem 28 such that its longitudinal axis is offset and at right angle from the longitudinal axis of the stem, as shown in FIG. 2.

Figure 4:
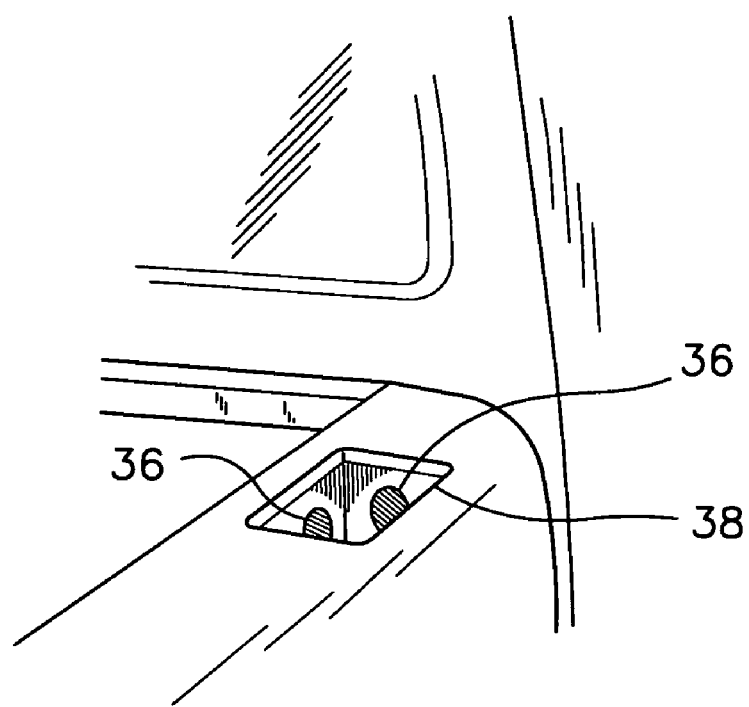
FIG. 4 is a partial perspective rear and side view of a truck box showing the stake pocket in the front right side of the box.
Figure 5:
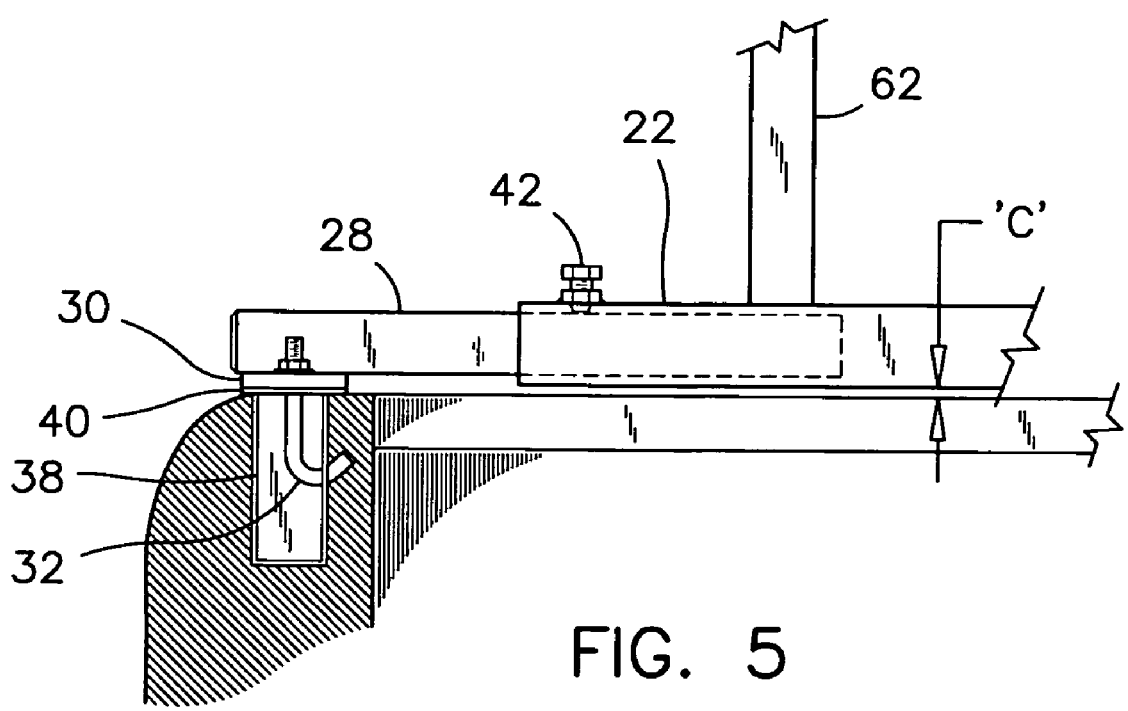
FIG. 5 is a partial cross-section view of a truck box showing an anchor bracket and a J-shaped hook extending into a stake pocket of the truck box.

A pair of J-shaped hooks 32 are inserted into the slots 34 of the anchor plates 30 and into the holes 36 normally found in the stake pockets 38 of a pickup truck, as shown in FIG. 4, to retain the anchor plates 28 and the entire cab guard 20 to the sides of the truck box, as shown in FIG. 5.

Because of the telescopic arrangement of the anchor brackets 26, the cab guard is adjustable to fit most half-ton and quarter-ton North American pickup trucks with stake pockets presently in service. It is believed that only two sizes of cab guards, as described herein, are needed to fit all North American pickup trucks with stake pockets presently in operation. For conventional half-ton trucks, the preferred length 'A' of the horizontal base member 22 is 36 inches, and the length 'B' of the stem member 28 is 22 to 24 inches. The preferred stem member 28 is made of hollow structural steel 1½ inches by 1½ inches by ⅛ inch wall thickness.

Referring particularly to FIG. 5, each of the anchor plates 30 has a preferred thickness of ⅜ inch and has a rubber pad 40 bonded to its bottom side. These pads 40 have a preferred thickness of about ⅛ inch and prevent a metal-to-metal contact between the cab guard 20 and the truck box.

A pair of set screws 42 are used to lock the stem members 28 inside the horizontal base member 22. These set screws 42 are mounted on the top of the base member 22 whereby their tightening raises the base member 22 above a plane defined by the bottom surfaces of the anchor plates 30, such that the cab guard 20 does not touch the front edge of the truck box, as illustrated by gap 'C' in FIG. 5. When the horizontal base member is made of a material having a 3/16 inch wall thickness, and the total thickness of the anchor plate with its rubber pad is ½ inch, then the gap 'C' is about 5/16 inch. This gap 'C' also contributes to preventing a metal-to-metal contact between the cab guard 20 and the truck box.

Figure 6:
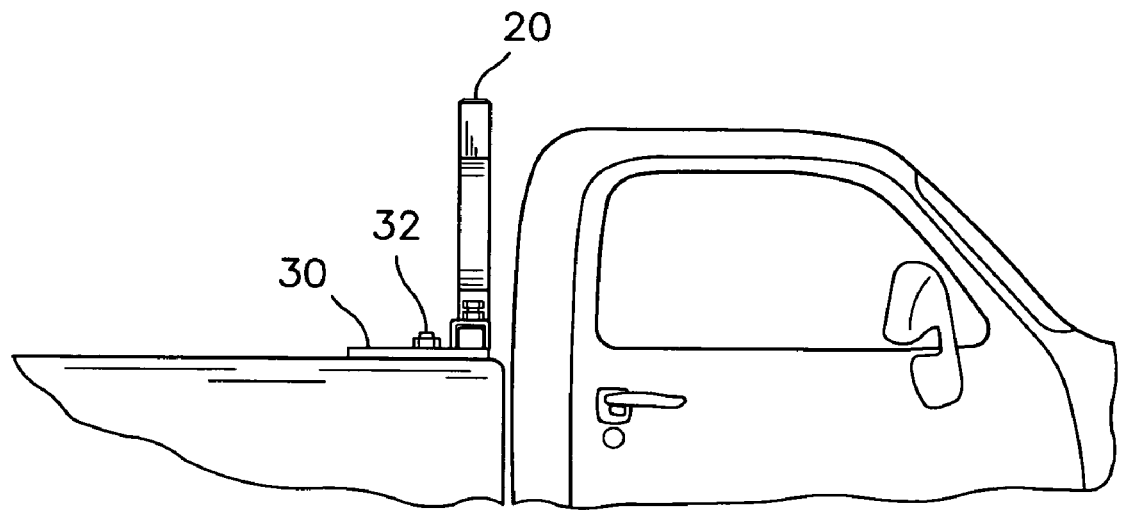
FIG. 6 is a partial side view of a pickup truck showing the preferred universal cab guard mounted in a conventional manner on the pickup truck box.
Figure 7:
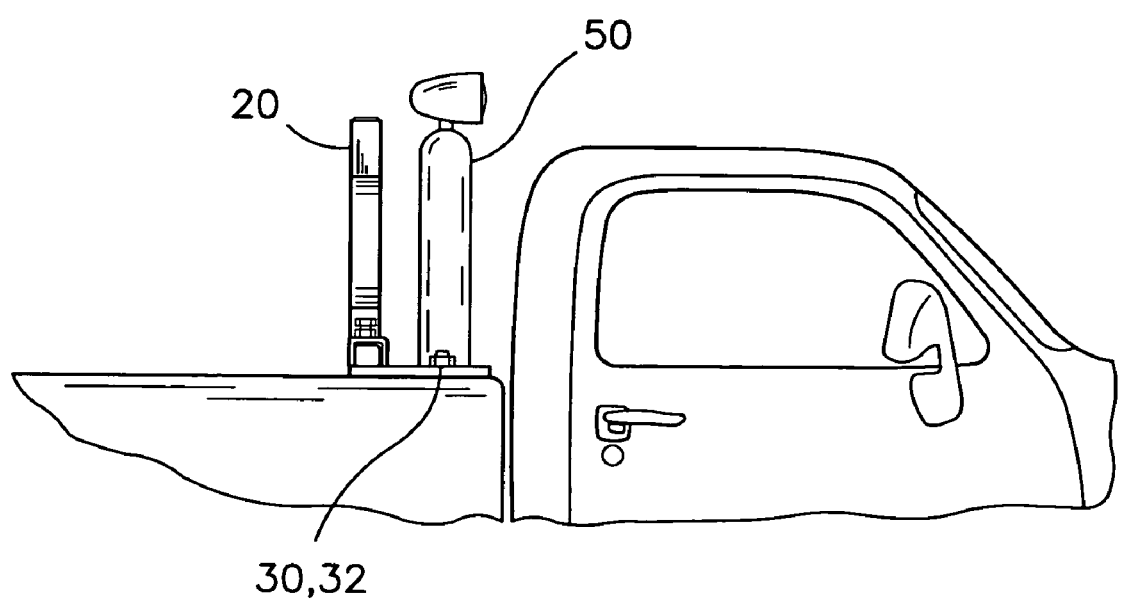
FIG. 7 is another partial side view of a pickup truck showing the preferred universal cab guard mounted on the pickup truck box behind a roll-over bar.

The slotted anchor plates 30 are advantageous for providing adjustment in the mounting of the cab guard 20 at a desired distance from the cab, as shown in FIG. 6. The symmetrical arrangement of the anchor brackets 26 is also advantageous for allowing a reverse installation thereof in the base member 22, for mounting the cab guard 20 backward, on a pickup truck that has a roll-over protection bar 50 bolted to the frame of the truck for example, as illustrated in FIG. 7.

The upper portion of the upright structure 24 comprises a brake light window 60 which is mounted between two upright members 62. The brake light window is made of a light metal frame 64 with two web plates 66 covering portions of the frame 64 on each end of the frame. A piece of transparent plastic material 68 such as LEXAN™ is affixed to both web plates 66 by screws 70 to cover the central portion of the brake light window. The transparent piece 68 is removably mounted to the web plates 66 such that it can be replaced if required.

Figure 8:
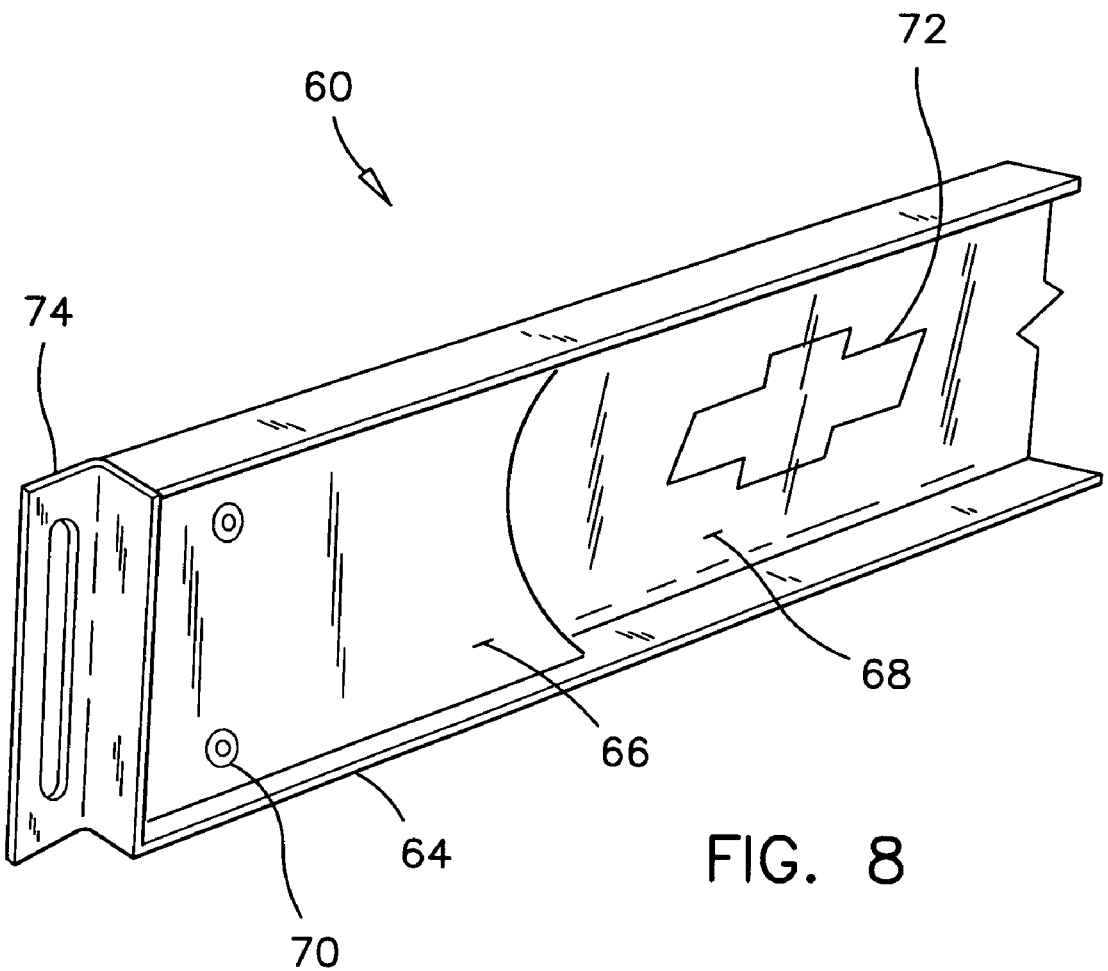
FIG. 8 is a partial perspective view of the brake light window in the preferred universal cab guard.

Preferably, the transparent piece 68, has a logo, a crest 72 or other advertising message printed, affixed or engraved thereon or cut out from it, as illustrated in FIG. 1 and FIG. 8.

The preferred brake light window 60 has a slotted angle 74 on each end. These slotted angles 74 are used to adjustably retain the brake light window 60 to the upright members 62 by bolts 76 as illustrated in FIG. 1. The brake light window 60 is thereby adjustable up and down to fit different truck cabs having a courtesy brake light at different places relative to the front end of the truck box.

Another optional accessory consists of a louver panel 78 mounted below the brake light window 60, as illustrated in FIG. 1. This louver panel 78 is also preferably adjustably mounted to the upright members 62 in a similar manner as the brake light window 60.

Figure 9:
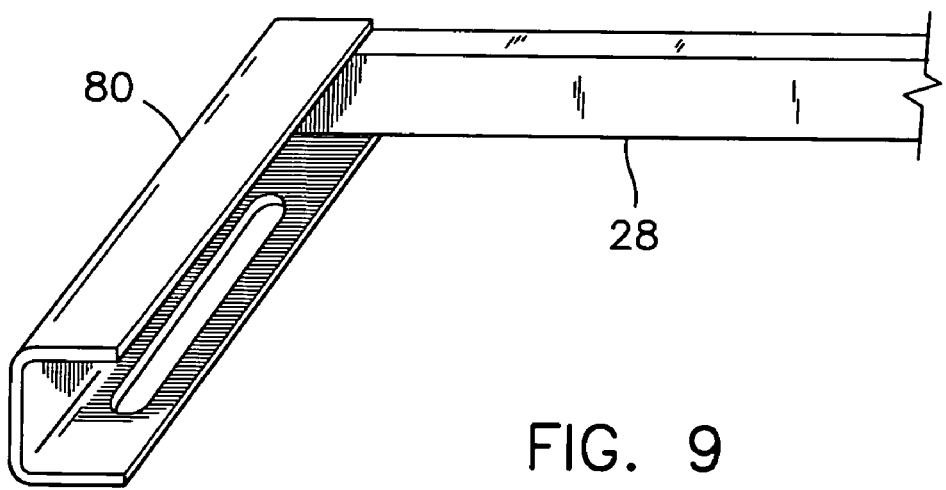
FIG. 9 is a perspective view of an alternate structure for the anchor bracket.

Referring now to FIG. 9, the anchor plate 30 may be replaced by a channel member 80 as illustrated, when the cab guard 20 is installed on a truck box also having a tool box mounted to the edges of the truck box. The tool box can be repositioned over the channel members 80 and fastened to the upper flanges of the channel members.

Another optional feature on the universal cab guard 20 comprises metal rings 82 affixed to the anchor brackets 26 as illustrated in FIGS. 2 and 3. These metal rings 82 are useful for tying down a load in the truck box.

Figure 10:
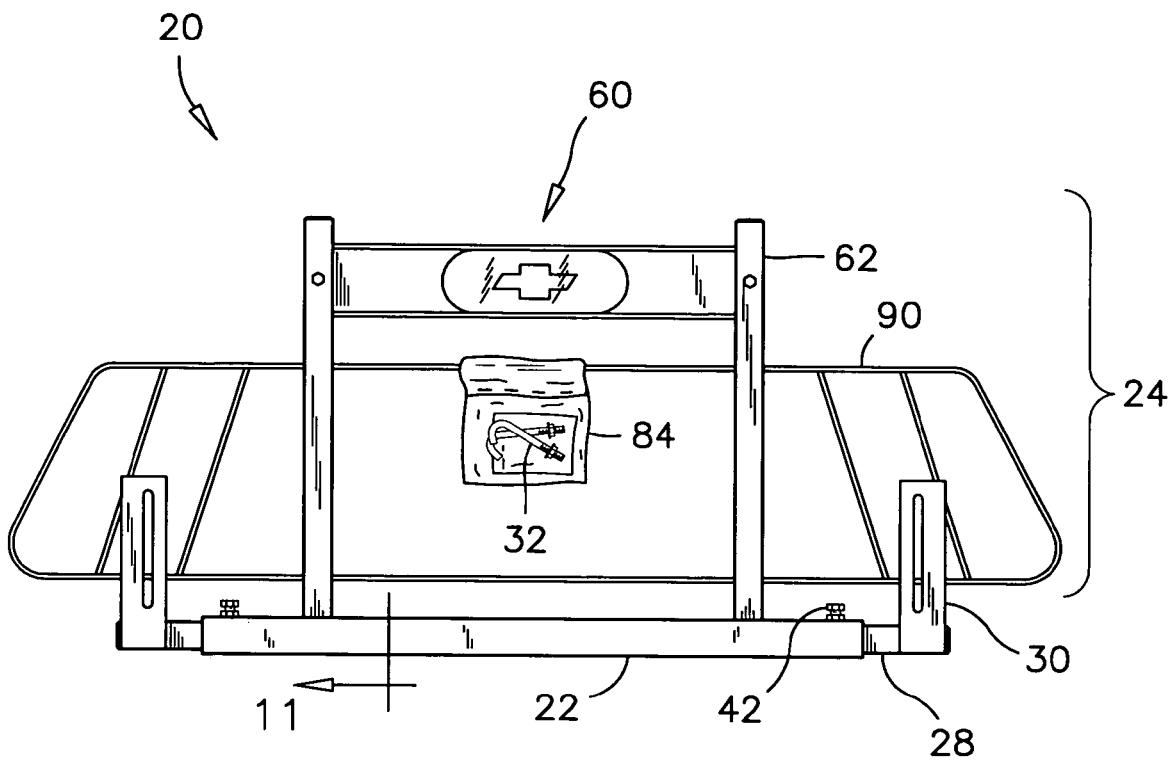
FIG. 10 is a rear view of the universal cab guard in a packaged mode.

As mentioned, the stem 28 of each anchor bracket 26 is made of square hollow structural steel 1½"×1½"×⅛" wall thickness. Also as mentioned, the longitudinal axis of each anchor plate 30 is offset from the longitudinal axis of its corresponding stem 28. These anchor brackets 26 can thereby be installed in various orientations in the horizontal base member 22, and more particularly, they can be installed in a compact packaged mode as illustrated in FIG. 10. The advantage of this orientation is that the anchor plates 30 are oriented in a same plane as the upright structure 24, and forms with the upright structure a compact arrangement.

Figure 11:
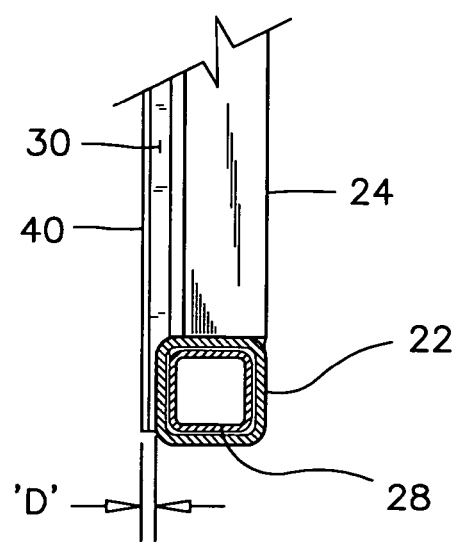
FIG. 11 is a cross-section view through the horizontal base member of the universal cab guard as seen along line 11 in FIG. 10.

In order to obtain this compact arrangement, the front plane of the upright structure 24 is welded even with the front side of the base member 22, as illustrated in FIG. 11. When the anchor plates 30 are in this orientation, the total thickness of the cab guard 20 is only about 3/16 to ¼ inch more than the thickness of the base member, as illustrated by dimension 'D' in FIG. 11. This compact arrangement is advantageous for packaging the cab guard in a cardboard box, for shipping the cab guard, for storing it in a warehouse, or for displaying the cab guard in a store. The delivery of the preferred cab guard to a customer is effected with the cab guard in the compact arrangement as shown in FIG. 10, with a pouch 84 containing the J-shaped hooks 32 and a mounting instruction leaflet, attached to any convenient location along the upright structure 24.

The upright members 62 are preferably made of hollow structural steel 1½"×1½"×⅛" wall thickness. The horizontal structural components 90 of the upright structure 24 are preferably made of steel flat bar 1½ inch wide by ¼ inch thick. The brake light window frame 64 is preferably made of steel flat bar 1 inch wide by ⅛ inch thick. A cab guard made of steel as described herein weights about 53 lbs.

As to other manner of usage and operation of the present invention, the same should be apparent from the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A cab guard for a pickup truck, comprising;
a horizontal base member made of hollow structural material;
an upright structure extending upward from said horizontal base member,
means for mounting said horizontal base member to sides of a pickup truck box; and
a brake light window mounted in said upright structure; said brake light window comprising a transparent piece having a logo affixed thereto and means for adjusting a position thereof up and down relative to said horizontal base member, said brake light window also comprising a frame and said transparent piece being removably affixed to said frame.

2. The cab guard as claimed in claim 1, wherein said means for adjusting comprises a slotted angle.

* * * * *